(12) United States Patent
Quigley

(10) Patent No.: US 12,429,126 B2
(45) Date of Patent: Sep. 30, 2025

(54) UNIVERSAL FRONT AXLE FOR RIGHT SIDE OR LEFT SIDE INSTALLATION

(71) Applicant: QUIGLEY MOTOR COMPANY, INC., Manchester, PA (US)

(72) Inventor: Todd Cameron Quigley, York, PA (US)

(73) Assignee: Quigley Motor Company, Inc., Manchester, PA (US)

( * ) Notice: Subject to any disclaimer, the term of this patent is extended or adjusted under 35 U.S.C. 154(b) by 56 days.

(21) Appl. No.: 18/591,837

(22) Filed: Feb. 29, 2024

(65) Prior Publication Data

US 2024/0295260 A1    Sep. 5, 2024

Related U.S. Application Data

(60) Provisional application No. 63/488,191, filed on Mar. 3, 2023.

(51) Int. Cl.

| | |
|---|---|
| *F16H 57/037* | (2012.01) |
| *B60B 35/16* | (2006.01) |
| *B60K 17/16* | (2006.01) |
| *B60K 17/344* | (2006.01) |
| *B62D 65/10* | (2006.01) |
| *F16H 48/42* | (2012.01) |
| *F16H 57/021* | (2012.01) |
| *F16H 57/02* | (2012.01) |

(52) U.S. Cl.
CPC ........... *F16H 57/037* (2013.01); *B60B 35/16* (2013.01); *B60K 17/165* (2013.01); *B60K 17/344* (2013.01); *B62D 65/10* (2013.01); *F16H 48/42* (2013.01); *F16H 57/021* (2013.01); *B60B 2320/10* (2013.01); *B60B 2900/116* (2013.01); *B60B 2900/351* (2013.01); *F16H 2057/02052* (2013.01)

(58) Field of Classification Search
CPC ...... F16H 57/037; F16H 48/42; F16H 57/021; F16H 2057/02052; B60B 35/16; B60B 2320/10; B60B 2900/116; B60B 2900/351; B60B 35/14; B60K 17/165; B60K 17/344; B60K 17/36
See application file for complete search history.

(56) References Cited

U.S. PATENT DOCUMENTS 1,692,932 A * 11/1928 Ford .................... B60B 35/16
                                                        74/607
3,420,327 A * 1/1969 Nallinger ............ B60K 17/306
                                                        180/375

(Continued)

*Primary Examiner* — Thomas C Diaz
(74) *Attorney, Agent, or Firm* — Saxton & Stump, LLC

(57) ABSTRACT

A modular axle assembly includes a differential casing with an input axis and a drive axis oriented at a right angle thereto, first and second casing connectors disposed on opposite sides of the differential casing and aligned on the drive axis, each connector including a shaft coupling. An axle extension selectively connectable to one of the casing connectors to extend along the drive axis toward a distal end is provided, a shaft coupling being provided at the distal end. The input axis location in relation to opposing ends of the modular axle may be selectively alterable by connecting the axle extender to the first casing connector or the second casing connector to best suit a specific vehicle installation.

14 Claims, 8 Drawing Sheets

(56) References Cited

U.S. PATENT DOCUMENTS

| | | | | |
|---|---|---|---|---|
| 5,839,327 A | * | 11/1998 | Gage | F16H 57/0457 |
| | | | | 184/13.1 |
| 6,257,090 B1 | * | 7/2001 | Arakawa | B60B 35/163 |
| | | | | 74/607 |
| 8,657,316 B1 | * | 2/2014 | Bowers | B60G 9/003 |
| | | | | 180/358 |
| 2005/0093364 A1 | * | 5/2005 | Li | B60B 35/16 |
| | | | | 301/124.1 |
| 2014/0265541 A1 | * | 9/2014 | Dockstader | F16H 57/0445 |
| | | | | 29/893.1 |

* cited by examiner

UNIVERSAL FRONT AXLE FOR RIGHT SIDE OR LEFT SIDE INSTALLATION

CROSS REFERENCE TO RELATED APPLICATIONS

This application claims priority benefit to provisional patent application No. 63/488,191 filed on Mar. 3, 2023, the entirety of which is incorporated by reference herein.

FIELD OF THE INVENTION

The present disclosure relates generally to vehicular drivetrains and, more particularly, to a modular front axle for four-wheel drive vehicles adaptable for right-side or left side drive shaft alignment.

BACKGROUND OF THE INVENTION

Four-wheel drive systems for vehicles in which power trains are longitudinally arranged generally requires that the drive shaft for one of the axles be laterally offset from the main engine/driveline axis. Drive lines for the front axles are most commonly laterally offset allowing the rear axle driveline to be arranged on the vehicle's longitudinal centerline and in line with the powertrain centerline. Front driveline offset is typically accomplished in a transfer case which offsets the front drive shaft take-off and provides a rear drive shaft take-off aligned on the main power drive line.

Drivetrain components in high-volume production runs (e.g., OEM applications) may be designed from the outset for a specific drive side configuration. Such OEM designs warrant drivetrain components specifically designed for right-side or left-side front axle drive shaft locations. Demands for continual improvements in production efficiency as well as after-market applications, make apparent the need to greater installation flexibility and adaptability, especially as more vehicle manufacturers turn to second-tier suppliers for components, including transmissions, axles, and other drivetrain components.

Such adaptability in drivetrain components does not currently exist in the automotive industry. Transfer cases and axles for longitudinal driveline four-wheel drive systems are specifically designed to laterally offset front axle drive shafts on only one side. Therefore, it would be desirable to have a universal powertrain component, such as the transfer case and/or axle, that can be easily adapted for use in a vehicle regardless of the required front driveline offset. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The concept and physical design of a universal drive train component, whether a transfer case or axle, will lend itself to a more streamlined timeframe during the engineering and design process. It also lends to a more efficient manufacturing process as well as reducing expenses and the amount of time from concept to market.

In an embodiment, a differential casing has an input axis and a drive axis oriented at a right angle thereto, first and second casing connectors disposed on opposite sides of the differential casing and aligned on the drive axis, each connector including a shaft coupling, and an axle extension selectively connectable to one of the casing connectors and to extend along the drive axis toward a distal end, the distal end having a shaft coupling, wherein the input axis location in relation to opposing ends of the modular axle is selectively alterable by connecting the axle extender to the first casing connector or the second casing connector.

In an embodiment, a differential casing includes first and second casing connectors disposed on opposite sides of the differential casing and aligned on the drive axis, each connector including a shaft coupling, an axle extension containing a shaft extension rotatably disposed therein, the shaft extension including a shaft interface configured to couple to the shaft couplings on the differential casing allowing the axle extension to be operably coupled to either side of the differential casing.

In an embodiment, an axle extension contains a shaft extension rotatably disposed therein, the shaft extension includes a shaft interface configured to couple to shaft couplings provided on opposite sides of a differential casing allowing the axle extension to be operably coupled to either side of the differential casing, the axle extension further having an axle coupling disposed on a distal end similarly configured to the shaft couplings provided on the differential casing. The shaft couplings are configured to receive conventional axle shafts used in drive axles having independent suspension systems.

In an embodiment, a differential casing has casing connectors for selectively attaching an axle extension that are symmetrically configured to enable connection of the axle extension in one of a plurality of rotational orientations about the drive axis. The axle extension may include an externally disposed appurtenance requiring space in the vehicle that may be best utilized by re-orienting the axle extension to locate the appurtenance in the available space.

In an embodiment, a method of installing a modular axle assembly into a vehicle includes identifying a primary drivetrain axis of the vehicle, an input axis for the modular axle assembly, and an offset between the drivetrain and input axes. A modular axle assembly is provided having a casing with an input alignable on the input axis, a pair of casing connectors arranged on a drive axis at a right angle to the input axis. Each casing connector includes a shaft coupling. An axle extension selectively connectable to one of the casing connectors is provided, having a shaft extension rotatably disposed therein with a proximally disposed shaft interface configured to operably couple to either of the casing connector shaft couplings and a distally disposed extension shaft coupling. Connecting the axle extension to one of the casing connectors offsets the casing input in relation to a midpoint between opposite ends of the modular axle assembly. Selecting which of the casing connectors to connect the axle extension allows the modular axle assembly casing input to be aligned proximate to the input axis so that the modular axle assembly can be installed into the vehicle.

In an embodiment, a method of installing a modular axle assembly into a vehicle includes providing a casing with an input alignable on the input axis, and a pair of casing connectors arranged on a drive axis at a right angle to the input axis to enable connection of an axle extension thereto. Each casing connector includes a shaft coupling. Each casing connector is symmetrically configured to enable connection of the axle extension in one of a plurality of rotational orientations about the drive axis to allow the axle extension to be adjusted to enable any externally mounted appurtenance attached to the axle extension to be oriented in a position best suited for the vehicle installation.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

The advantages of this invention will be apparent upon consideration of the following detailed disclosure of the invention, especially when taken in conjunction with the accompanying drawings wherein.

Wherever possible, the same reference numbers will be used throughout the drawings to represent the same parts.

DETAILED DESCRIPTION OF THE INVENTION

Transfer cases and axles are either a left-side installation or a right-side installation, based off the centerline of an Original Equipment (OE) manufacturer's powertrain centerline. Transfer cases and axles according to the present disclosure have a design that may be mounted or installed on either side of the OE's powertrain centerline. In one embodiment, both a transfer case and an axle having the universal configuration are configured to permit the installation on an OE's powertrain. To provide the universal configuration, the component should have a raw casting configured to permit multiple unique connection features to be machined while still maintaining the correct alignment of the connection features with the other drivetrain components. Once the castings are engineered to be universal in nature, the second phase is to engineer the machining of the casting to adapt it to one of a plurality of installation orientations. The machining step transforms the universal casting into one specific to a right-side or a left-side driveline installation.

The transfer case and the axle, whether they are machined for a left-side or right-side installation, still have the same internal components which is another feat unto itself. Our final transfer case and axle products are universal in relation to how they can be installed/mounted simply based on how we choose to machine the raw casting. We can achieve a left-side or right-side installation/mounting.

Figure 1:
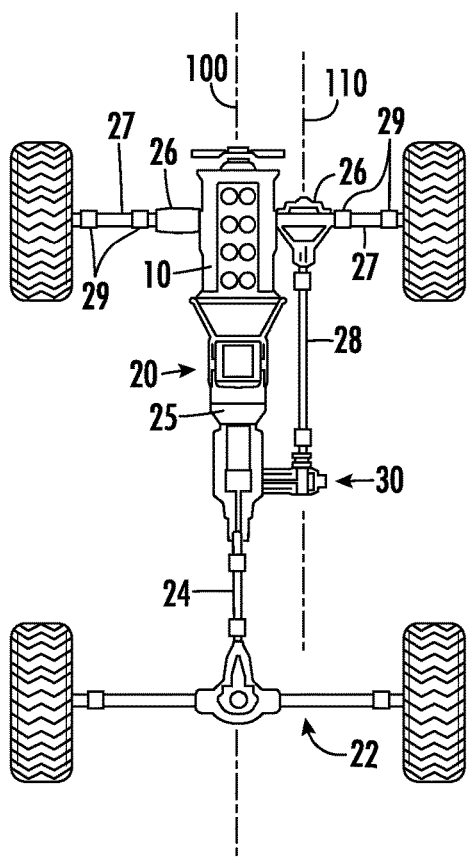
FIG. 1 illustrates a drivetrain layout in a four-wheel drive vehicle in which the front driveline is offset to the right.
Figure 2:
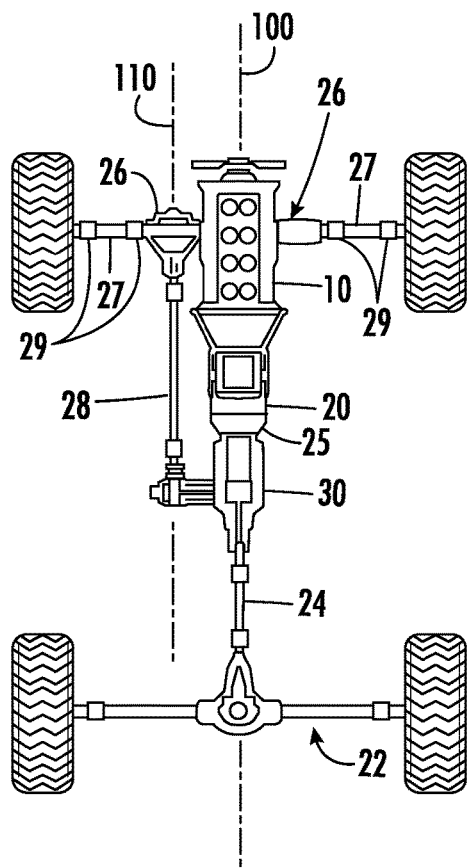
FIG. 2 illustrates a drivetrain layout in a four-wheel drive vehicle in which the front driveline is offset to the left.
Figure 3:
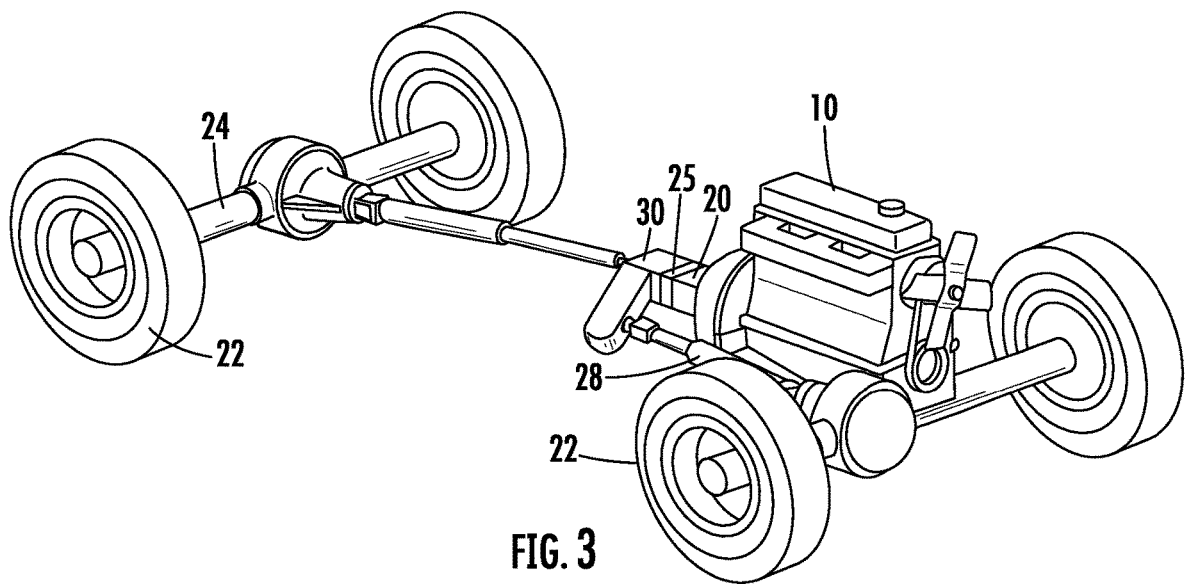
FIG. 3 is a side elevation illustration of a drivetrain layout in a four-wheel drive vehicle.

Referring to FIGS. 1 through 3, diagrams of traditional drivetrain layouts illustrate laterally offset front drive mechanism. There is shown a powertrain 10 longitudinally oriented in a vehicle and defining a primary axis 100. A transmission 20 is coupled to the powertrain 10 and a transfer case 30 is coupled to the transmission by a mechanical adapter connector 25. The transfer case 30 splits drive torque from the transmission 20 between a rear drive axle 22 and a front drive axle 26. Drive torque is delivered to the rear axle 22 through rear driveshaft 24; drive torque is delivered to the front axle 26 through front driveshaft 28. The preferred alignment of the transmission and transfer case input is in line with the powertrain axis, primary axis 100 as illustrated. Spatial demands for locating the front driveshaft requires offsetting the front driveshaft from the primary axis to a secondary axis 110. The secondary axis offset from the primary axis may be lateral or a combination of lateral and vertical displacement. Each axle includes a differential which reorients driveshaft rotation from generally longitudinal (primary axis 100 or secondary axis 110) to a transverse drive axis 120 oriented at right angles to the longitudinal axes to allow drive rotation input to be delivered via drive shafts to the vehicle wheels.

The drive axis 120 is defined by the axle shafts and is the center of rotation for the rotating axle shafts connections for the axle shafts. The drive axis is conventionally transverse to the vehicle to which the axle is attached. Torque input to the axle is delivered along an input axis 110 via front driveshaft 28, often referred to as the pinion axis, which is oriented at a right angle to the drive axis 120. The drive axis and the input axis may intersect, such as in differentials using a bevel gear arrangement. Vehicle differential assemblies commonly incorporate hypoid gears which offset the pinion axis from the drive axis so that the axes do not intersect, locating the pinon axis either above or below the drive axis. The axes are arranged at a right angle (from a vehicle longitudinal axis to a vehicle transverse axis), but the drive axis perpendicularly intersects a vertical plane in which the input or pinion axis lies. This type of skewed axis relationship is sometimes referred to as orthogonal. As used herein, the term orthogonal describes the perpendicular alignment of the drive axis with a vertical plane in which the input axis lies. The arrangement may also be described as oriented at right angles.

Front axles may be solid axles in which a unitary structure laterally spans between the front wheels. The outboard ends of the axle include connections to allow the front wheels to be steered, but the axle assembly is a structural beam spanning between the wheels and the vehicle in turn is supported on the axle. Front axles may also be adapted for use with independent suspensions in which the front axle structure is separated vehicle suspension. A portion of the front drive axle 26 is attached to the vehicle and axle shafts 27, sometimes referred to as half-shafts, extend between the axle structure to wheel hubs. The half-shafts 27 include flexible joints 29 to allow the axle shafts to deflect from the drive axis established by the differential. The flexible joints 29 also allow the front wheels to be steered. The flexible joints 29 may be universal joints, constant-velocity joints, or other functionally equivalent mechanism enabling deflection of the half shaft from the drive axis. The universal modular axle of the present invention is configured for use in independent front suspension applications.

FIGS. 4-10 illustrate an embodiment of a modular universal axle assembly 50 that may be adapted for installation in either a right-side (FIG. 1) or a left-side (FIG. 2) front axle application. The modular axle assembly 50 includes a casing 52 housing drivetrain gears and differential, an axle extension 72 which may be connected to the casing 52 in one of two laterally opposed locations, an input shaft coupling 53, and output shaft couplings 55 which direct drive torque from the differential to drive wheels on the vehicle. The connection between the axle extension 72 and the casing 52 includes a casing connector 54, one disposed on each lateral side of the differential casing 52. Each casing connector 54 provides a mechanical connection interface which matches an extension connector 74 provided on the axle extension 72. The connector interface may be a flanged connection including a plurality of holes 73 engageable with fasteners 56 engaging matching connections machined into the casing connector 54. The flanged interface may be symmetrically configured to allow the axle extension 72 to be connected to the casing in one of a plurality of rotational orientations about the drive axis 120. This installation flexibility, referred to as "clocking", allow the axle extension to be positioned to fit within the spatial constraints of the vehicle. The flanged interfaces of the casing connector 54 may be selectively machined dependent upon which side of the casing the axle extension is connected. The flange on the unused casing connector 54 may be left in an as-cast form (unmachined) without provisions for fastener installation for reduced production costs.

The differential casing 52 may include a plurality of attachment interfaces 59, 69, 79 to facilitate connection to the vehicle or to allow supports or devices to be attached to the casing. These interface features may be incorporated into the structure of the casing in multiple locations and then selectively machined to provide the final connection interface dependent upon the installed orientation of the differential casing. For example, the connection features may be selectively used with mounting brackets for attaching the axle to the vehicle. The mounting brackets in selective combination attachment interfaces 59 along with attachment interface 78 of the axle extension can then be used to adjust the orientation of the front axle in the vehicle (i.e. adjust the pinion angle) in either vertical position, up or down. The alternative attachment interfaces may remain unmachined to minimize the required machining operations to place the axle assembly into service.

The differential casing 52 may also include a fluid fill opening 57 and a fluid drain opening 58 to allow lubricant to added or replaced. The drain opening 58 may be omitted in some installations wherein fluid removal requires some disassembly of the casing (e.g., removal of a cover plate).

The ability of the axle extension 72 to be installed in one of a plurality of positions, referred to as "clocking", allows the axle extension to be positioned to fit within the spatial constraints of the vehicle. Axle clocking also allows attached devices or appurtenances which have limited attachment options to be re-oriented to best fit within available space in the vehicle. In the illustrated embodiment an appurtenance, such as drive engagement servo 90 is shown in a forward-facing orientation. Clocking the axle extension may allow the appurtenance to be positioned above, below, or to the rear of the axle extension as well, dependent upon available space in the vehicle installation.

The axle extension may include a plurality of external attachment interfaces 78 to facilitate an adjustable connection to the vehicle (e.g., pinion axis adjustment) or to allow supports or devices to be attached to the axle extension. These interface features may be incorporated into the structure of the axle extension in multiple locations and then selectively machined to provide the final connection interface dependent upon the installed orientation of the axle extension. The alternative interface features remain unmachined to minimize the machining operations required on the axle tubes.

The axle extension 72 houses an axle shaft extension 76 to transfer drive torque from the differential output coupling 55 to an extension output coupling 75 at the distal end. The differential output shaft couplings 55 and extension output coupling are similarly configured to interface with conventional drive shafts used in independent suspension systems for driven axles. The couplings 55, 75 may include a splined shaft interface with retention means as is well known in the art. The inboard end of the axle shaft extension 76 includes a shaft interface configured to be coupled to the differential output coupling in the same manner as any drive shaft. The shaft extension 76 interface is preferably splined. The splined shaft interface on couplings 55, 75 is preferably configured as a socket to receive the plug end of the axle shaft extension 76.

Figure 4:
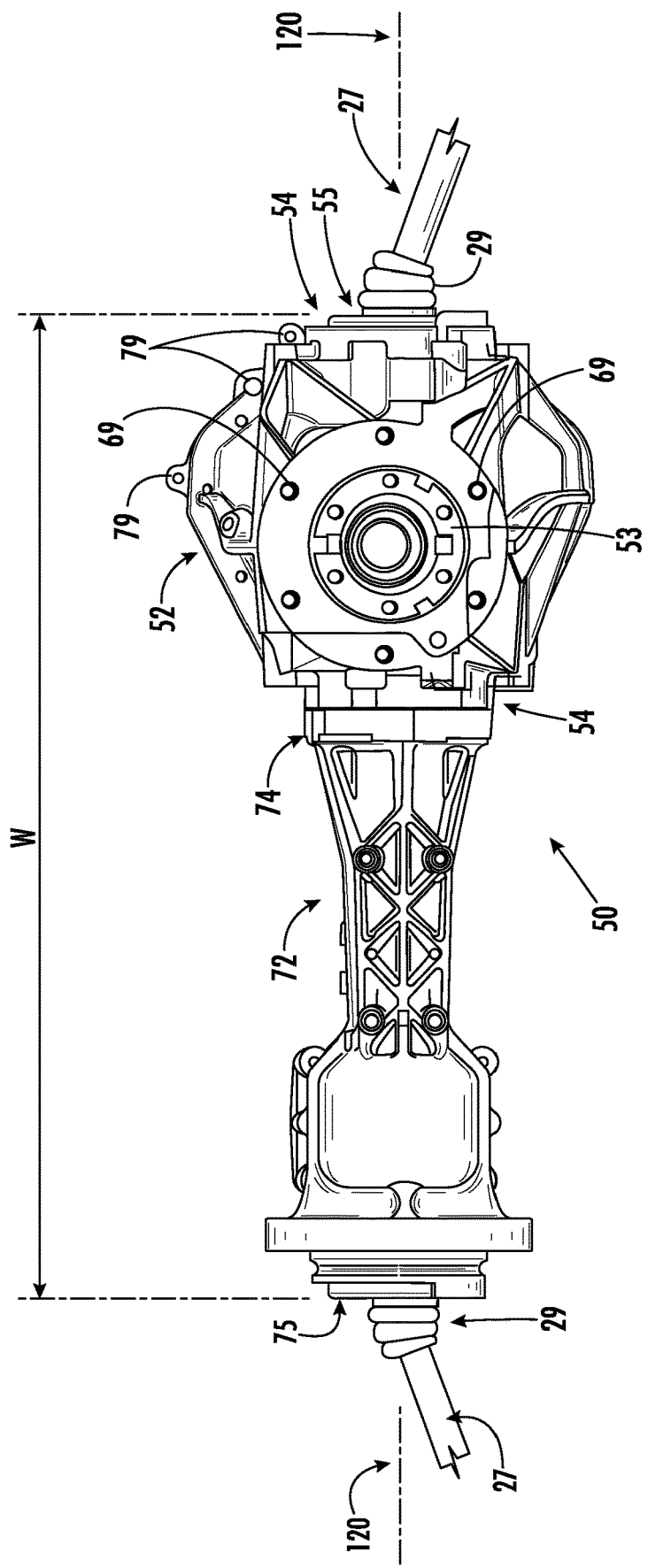
FIG. 4 is a rear elevation view of a modular universal axle assembly configured for a front driveline offset to the right.
Figure 5:
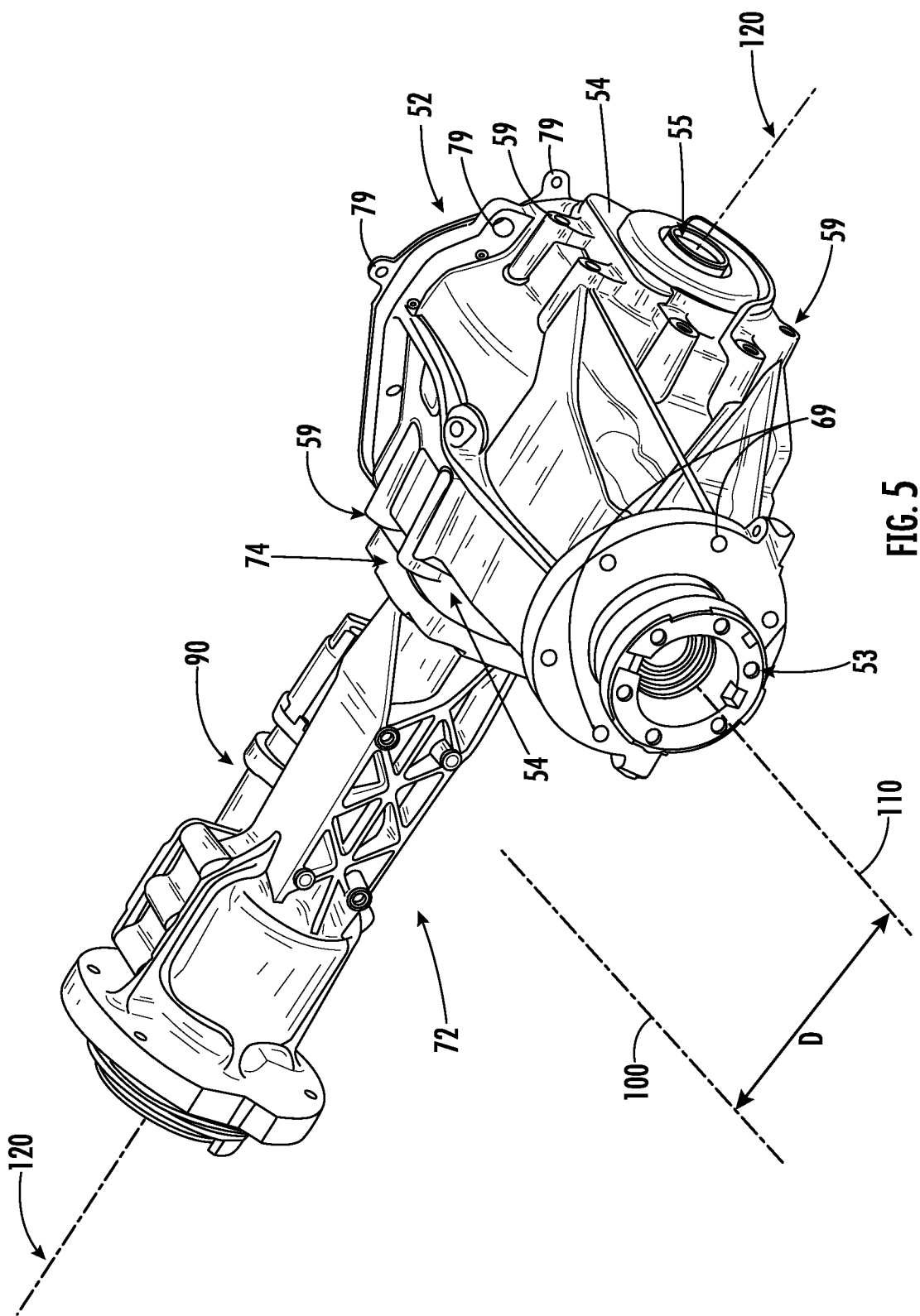
FIG. 5 is a rear perspective view of the modular universal axle assembly shown in FIG. 4.
Figure 6:
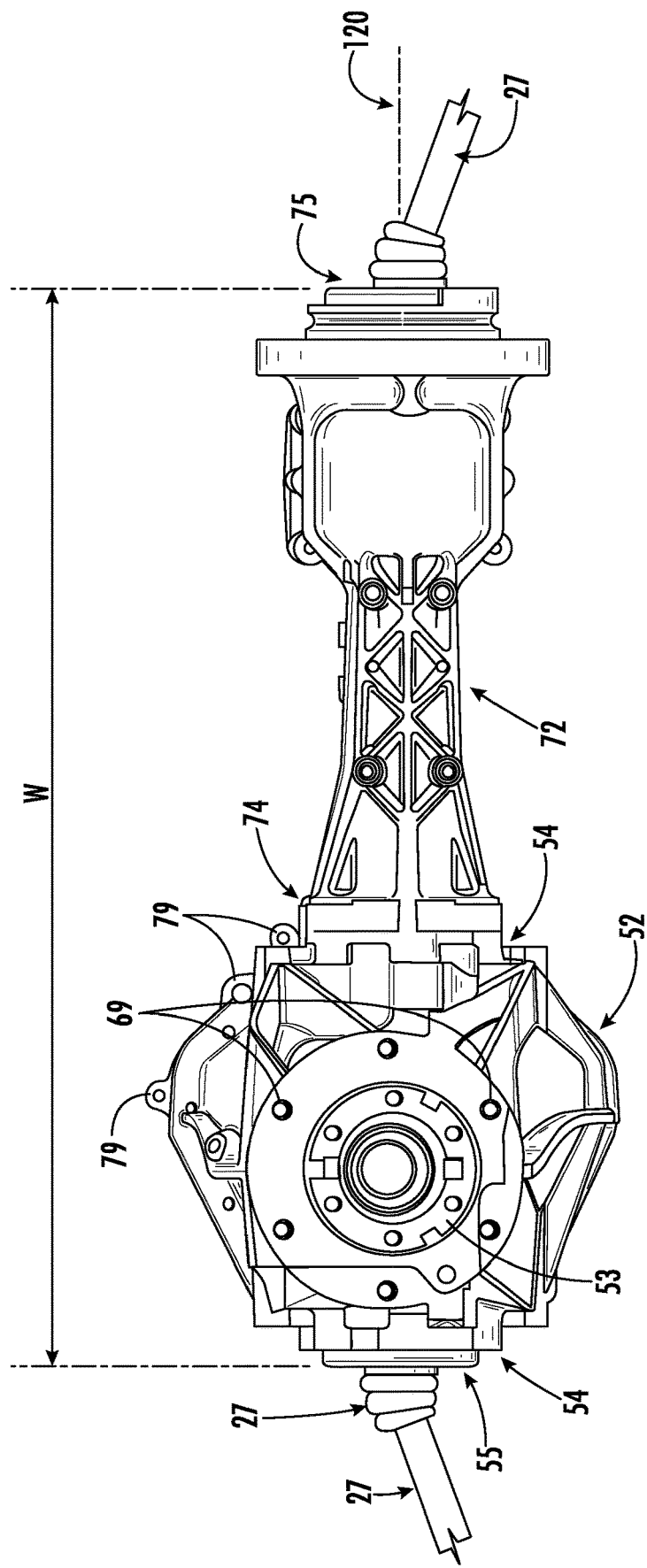
FIG. 6 is a rear elevation view of a modular universal axle assembly configured for a front driveline offset to the left.
Figure 7:
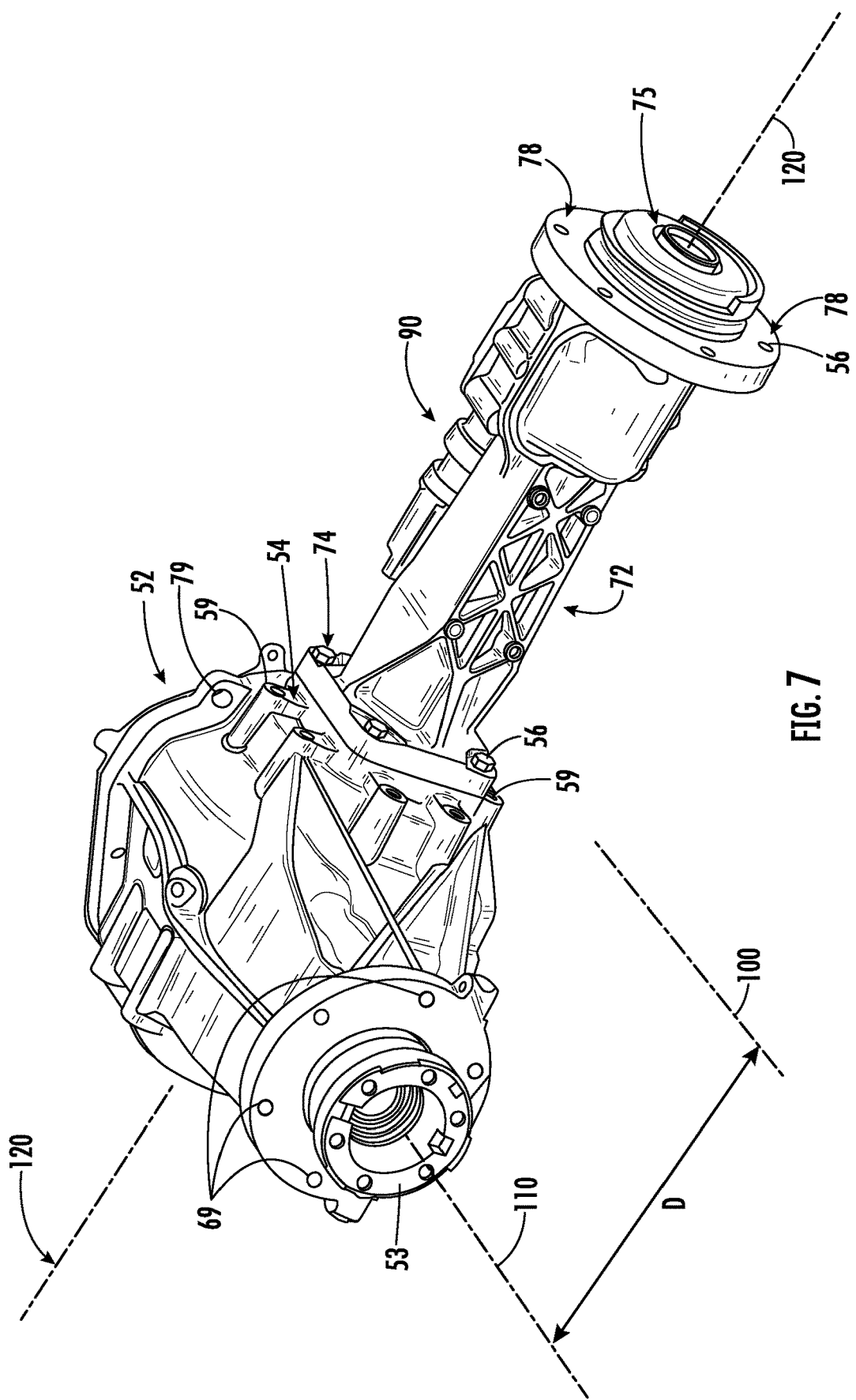
FIG. 7 is a rear perspective view of the modular universal axle assembly shown in FIG. 6.
Figure 8:
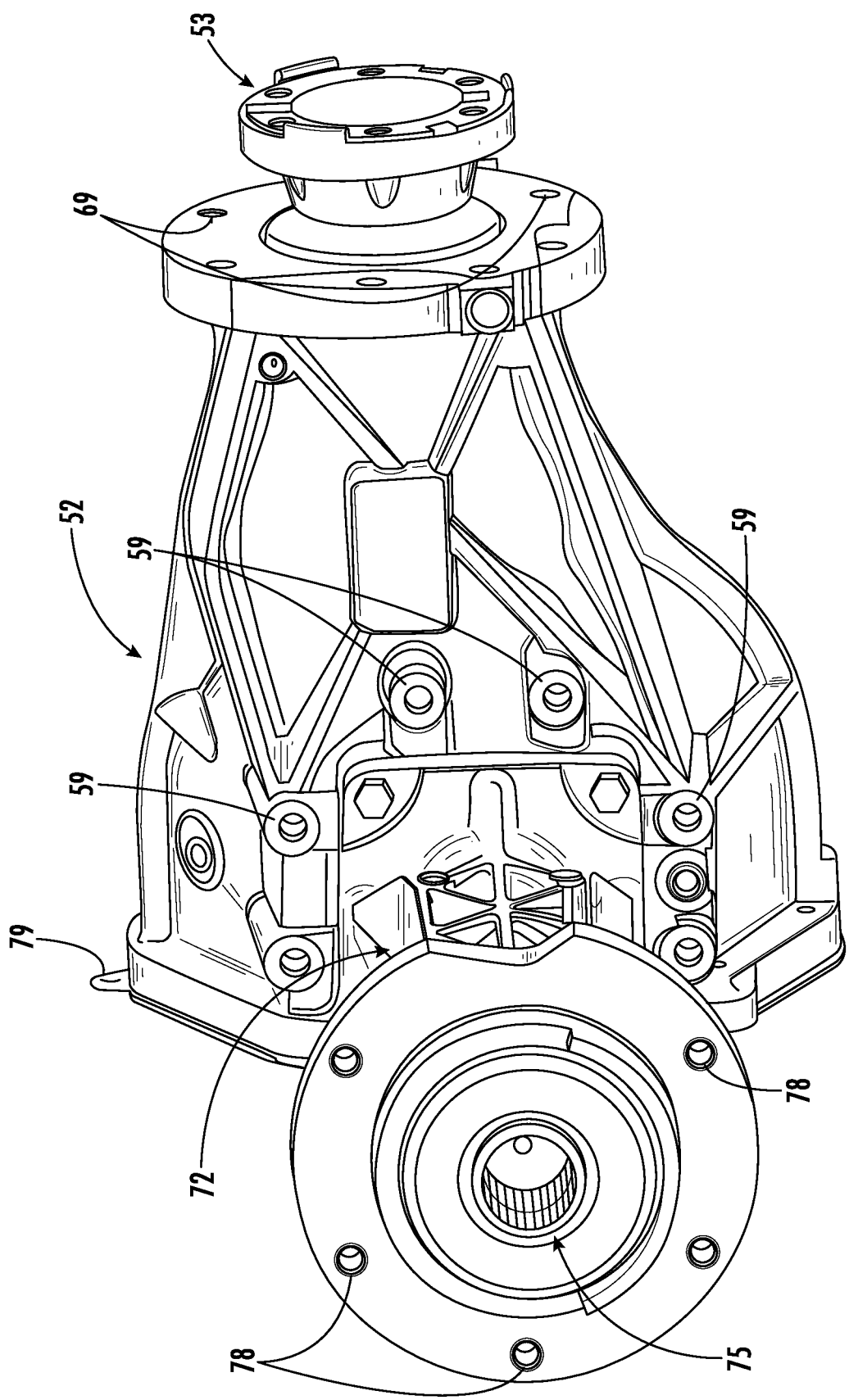
FIG. 8 is left perspective view of the end of the axle assembly of FIG. 4 showing an axle shaft connection on a distal end of an axle housing.
Figure 9:
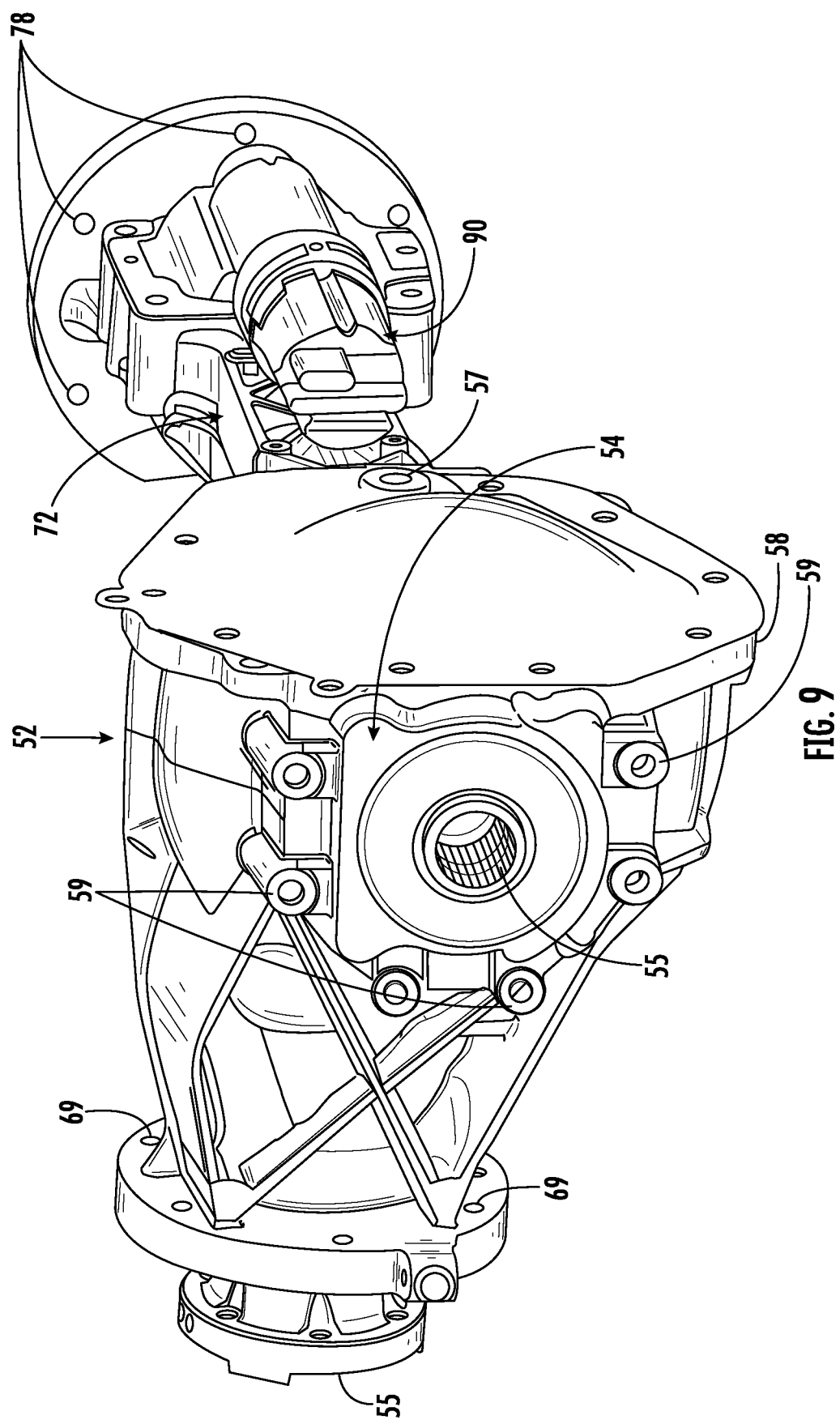
FIG. 9 a right perspective view of the differential casing of FIG. 4 showing an axle shaft connection.
Figure 10:
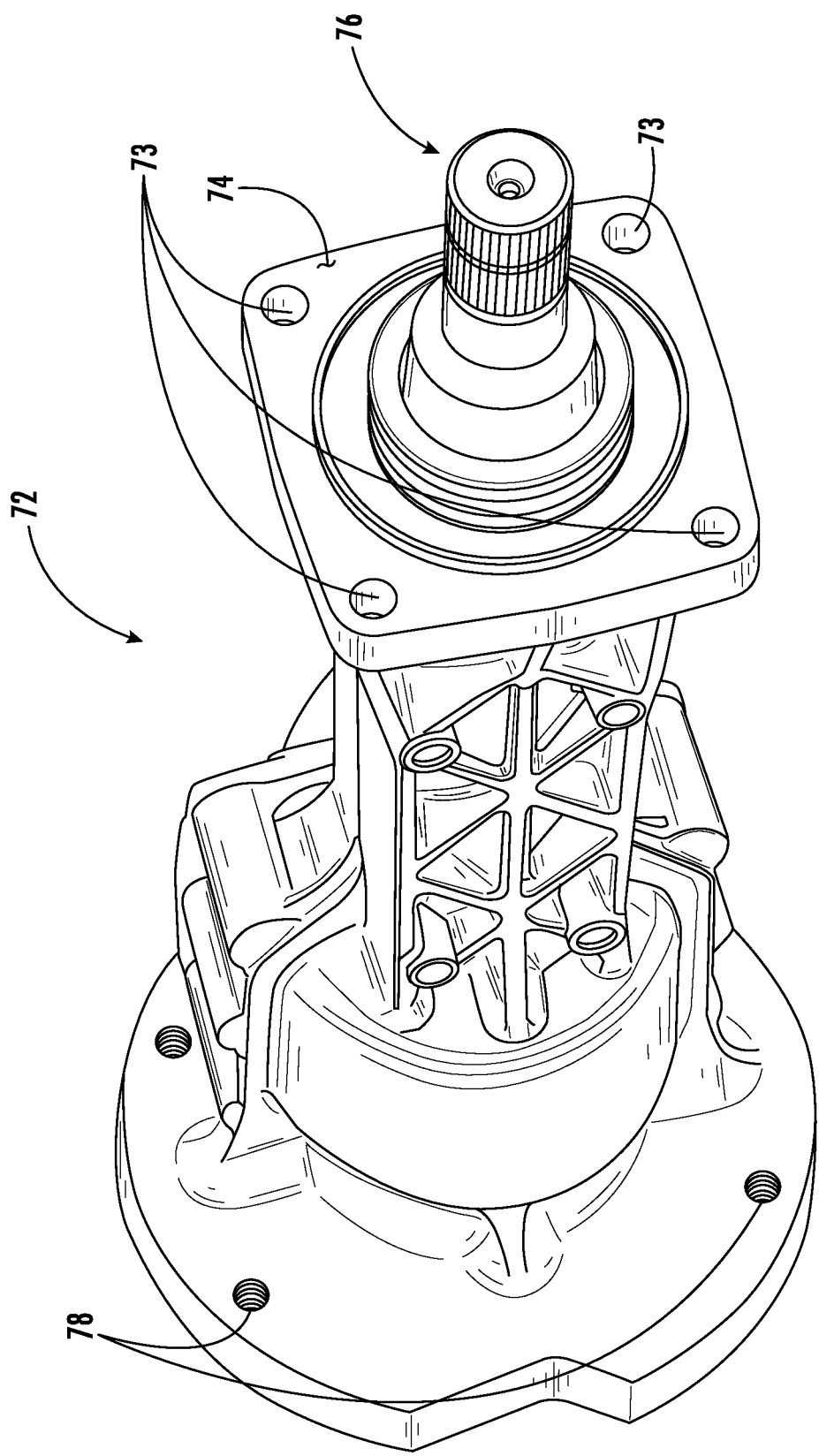
FIG. 10 is a perspective view of an axle extension used in the present invention.

The length of the axle extension 72 combined with the differential casing width between the output couplings 55 defines the axle width (dimension "W" as illustrated in FIGS. 4 and 6) is configured to permit the combined differential casing and axle extension to be positioned in a vehicle so that the vehicle axle shafts 27 are generally equal length while providing the necessary lateral displacement of the secondary axis 110 from the primary axis 100 (shown as dimension "D" in FIGS. 5 and 7).

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A modular axle for a vehicle comprising:
   a differential casing having an input axis and a drive axis oriented at a right angle thereto;
   first and second casing connectors disposed on opposite sides of the differential casing and aligned on the drive axis, each connector including a shaft coupling;

an axle extension selectively connectable to one of the casing connectors and to extend along the drive axis toward a distal end, the distal end having a shaft coupling; and a plurality of attachment interfaces configured to enable selective alteration of attachment of the modular axle to the vehicle;

wherein the input axis location in relation to opposing ends of the modular axle is selectively alterable by connecting the axle extension to the first casing connector or the second casing connector.

2. The modular axle of claim 1, further comprising a shaft extension rotatably disposed in the axle extension, the shaft extension configured to operably couple to the shaft couplings on the casing connectors.

3. The modular axle of claim 2, wherein the differential casing shaft couplings and the axle extension shaft coupling each have a like-configured, torque-transferring shaft interface.

4. The modular axle of claim 3, wherein the shaft interface is a splined connection.

5. The modular axle of claim 1, wherein the first and second casing connectors are symmetrically configured to enable connection of the axle extension in one of a plurality of rotational orientations about the drive axis.

6. A modular axle for a vehicle comprising:
a differential casing having an input axis parallel to a primary drivetrain axis of the vehicle, and a drive axis oriented at a right angle thereto;
a pair of casing connectors disposed on opposite sides of the differential casing and aligned on the drive axis;
a plurality of attachment interfaces configured to enable selective alteration of attachment of the modular axle to the vehicle; and
an elongate axle extension selectively connectable to one of the casing connectors;
wherein swapping the axle extension connection between the opposing casing connectors shifts the location of the input axis in relation to primary drivetrain axis.

7. The modular axle of claim 6, wherein each differential casing connector further comprises a shaft coupling.

8. The modular axle of claim 7, wherein the axle extension further comprises a shaft extension rotatably disposed therein, the shaft extension having a proximally disposed shaft interface configured to operably couple the casing connector shaft coupling and a distally disposed extension shaft coupling.

9. The modular axle of claim 8, wherein the casing connectors are configured to enable the axle extension to be connected in one of a plurality of rotational orientations about the drive axis.

10. The modular axle of claim 8, wherein the differential casing shaft couplings and the axle extension shaft coupling each have a like-configured, torque-transferring shaft interface.

11. The modular axle of claim 10, wherein the shaft interface is a splined connection.

12. A method of installing a modular axle assembly into a vehicle drive axle comprising the steps of:
identifying a primary drivetrain axis of the vehicle;
identifying an input axis for the drive axle;
determining an offset of the input axis from the longitudinal vehicle axis;
providing a modular axle assembly having a casing with an input alignable on the input axis, a pair of casing connectors arranged on a drive axis at a right angle to the input axis, each casing connector having a shaft coupling;
providing a plurality of attachment interfaces on the modular axle assembly;
providing an axle extension selectively connectable to one of the casing connectors, the axle extension having a shaft extension rotatably disposed therein with a proximally disposed shaft interface configured to operably couple to either of the casing connector shaft couplings and a distally disposed extension shaft coupling;
connecting the axle extension to one of the casing connectors, the connected axle extension and casing offsetting the casing input in relation to a midpoint between opposite ends of the modular axle assembly, the casing connector being selected to align the modular axle assembly casing input proximate to the input axis;
selecting one or more of the plurality of attachment interfaces to connect the modular axle assembly to the vehicle in a desired orientation; and
connecting the modular axle assembly to the vehicle.

13. The method of claim 12, further comprising the step of:
performing a machining operation of the selected casing connector to enable connection of the axle extension.

14. The method of claim 13, further comprising the steps of:
configured the casing connectors to enable the axle extension to be connected in one of a plurality of rotational orientations about the drive axis;
connecting an appurtenance to the axle extension; and
orienting the axle extension to allow the appurtenance to fit within available space in the vehicle.

* * * * *